June 6, 1972 — J. W. ARMSTRONG — 3,667,822
CONED END ROLLER BEARING
Filed March 1, 1971

INVENTOR.
JACK W. ARMSTRONG
BY
ATTORNEYS.

United States Patent Office 3,667,822
Patented June 6, 1972

3,667,822
CONED END ROLLER BEARING
Jack W. Armstrong, Baldwinsville, N.Y., assignor to
Lipe-Rollway Corporation
Filed Mar. 1, 1971, Ser. No. 119,482
Int. Cl. F16c *19/34*
U.S. Cl. 308—213                     1 Claim

ABSTRACT OF THE DISCLOSURE

A radial type roller bearing having a relatively high axial load carrying capacity. The bearing rollers are formed with frusto-conical end faces which engage correspondingly tapered race flanges to take the thrust loads. The angle of the coned portion of the rollers is within a predetermined range that is the critical factor in obtaining the performance desired.

BACKGROUND OF THE INVENTION

This invention relates generally to anti-friction roller bearings, and has particular reference to an improved roller bearing having a high capacity for both radial and axial loads.

In many applications, radial bearings are subjected to substantial axial or thrust loads. Conventional radial bearings with square ended rollers have only limited axial load capacity because as the load increases there is more and more sliding contact between the roller end faces and race flanges, and this in turn causes excessive friction and high operating temperatures. As a result, premature bearing failure may occur. Conventional thrust bearings, on the other hand, are not adapted for applications of this type as they have no radial load capacity.

Heretofore, in applications where bearings have been required to withstand substantial radial and axial loads, one solution has been to use a radial bearing and thrust bearing in combination. This, of course, increases the cost and space requirements. Another solution has been to utilize tapered roller bearings but these generally have less radial load capacity than a cylindrical roller bearing of comparable size.

Still another approach to solving the problem of bearings subjected to substantial radial and axial loads has been the provision of radial bearings with frusto-conical end faces. Examples of bearings of this type are disclosed in U.S. Pat. No. 924,387 granted June 8, 1909 to C. I. Shirley; U.S. Pat. No. 1,494,638 granted May 20, 1924 to F. D. Sheldon and U.S. Pat. No. 1,773,461 granted Aug. 19, 1930 to A. T. Killian. It has been found, however, that in bearings of this type excessive friction and heat are still generated between the roller end faces and race flanges because the angle of the coned portions of the rollers with respect to a plane perpendicular to the roller axis is too large to be conducive to good hydrodynamic lubrication.

One other approach to the problem of substantial radial and axial bearing loads that should be noted is that disclosed in U.S. Pat. No. 3,268,278 granted Aug. 23, 1966 to G. T. Purdy. In this patent the rollers are formed with sphered end faces which engage planar tapered race flanges. The roller-race contact under an axial load is thus a ball bearing point contact which does not afford as much axial load capacity as would be gained with roller line contact.

SUMMARY OF THE INVENTION

The bearing provided by the present invention is a radial type roller bearing having an improved construction which enables it to carry heavy axial loads. The bearing rollers are formed with frusto-conical end faces that engage correspondingly tapered race flanges to take the thrust loads. However, unlike the bearings disclosed in the Shirley, Sheldon and Killian patents cited above, the angle between the coned portion of the roller and an intersecting plane perpendicular to the roller axis is very small. Thus, it has been found that if this angle is kept within a limited critical range the angled roller ends make semi-rolling, line contact with the mating race flanges which minimizes sliding and at the same time gives the bearing the capacity to carry heavier axial loads than any radial roller bearing developed heretofore.

By maintaining the angle of the coned ends of the rollers within the critical range to be disclosed hereinafter it has also been found that optimum conditions are present for establishing a lubricant wedge between the parts whereby good hydrodynamic action of the lubricant is obtained. Moreover, lubricant is not wiped off the ends of the rollers of the invention as it is with square ended rollers and mating right angle flanges. Since there is far less sliding contact in the bearing of the invention than would occur with square ended rollers under axial load, there is less friction and the bearing will operate at lower temperatures.

BRIEF DESCRIPTION OF THE DRAWINGS

In describing the invention reference is had to the accompanying drawings in which like reference numbers designate corresponding parts in all the views.

DESCRIPTION OF THE PREFERRED EMBODIMENT

Figure 1:
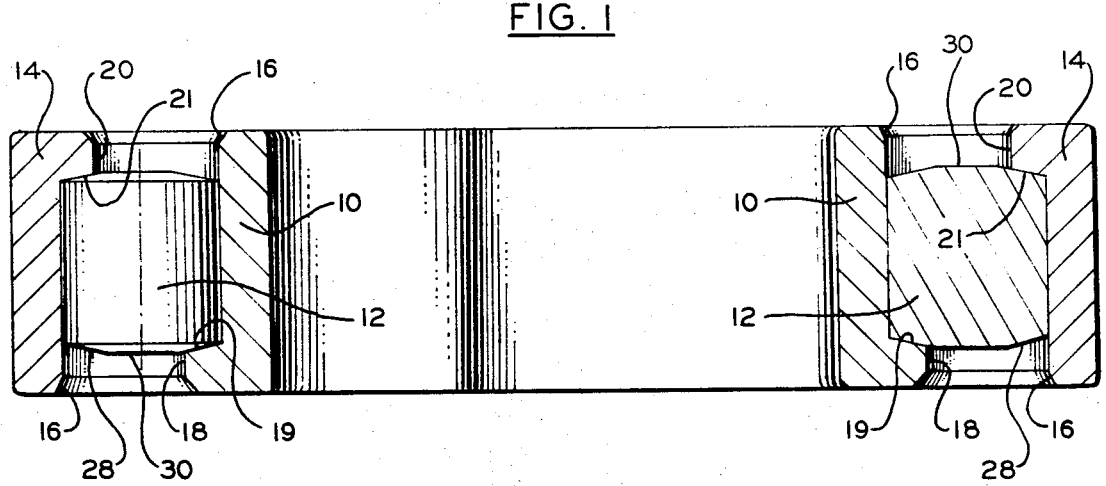
FIG. 1 is a cross-sectional view of the preferred embodiment of the invention.

Referring to FIG. 1, the preferred embodiment of the invention comprises an inner race 10, anti-friction roller elements 12 and an outer race 14. The inner and outer races are each formed on one side with tapered surfaces 16 to facilitate assembly of the bearing.

Inner race 10 is formed with at least one flange 18 having a roller engaging face portion 19. Outer race 14 is similarly formed with at least one flange 20 having a roller engaging face portion 21. The face portions 19 and 21 are in opposed relation to each other to receive therebetween the rollers 12 so as to permit axial loads to be transmitted by the bearing.

The face portions 19 and 21 of the inner and outer races, respectively, contact portions of the offset end faces of the rollers and are parallel to (within normal manufacturing tolerances) the sloping frusto-conical portions of the roller end faces which are formed with a predetermined angle within a critical range described below.

Figure 2:
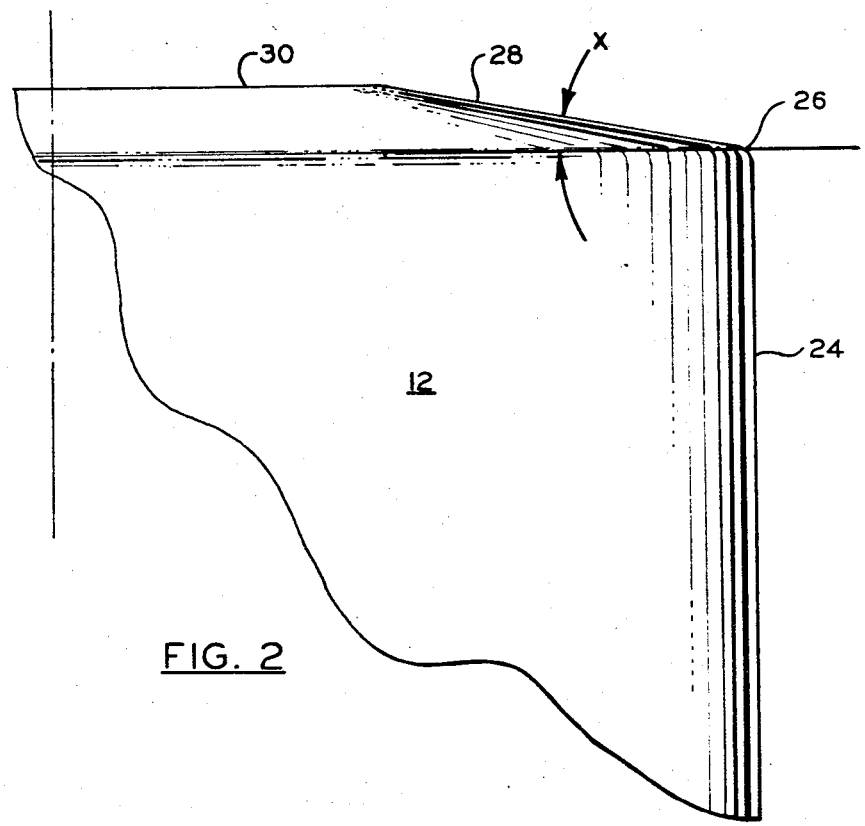
FIG. 2 is an exaggerated fragmentary showing of a portion of one of the bearing rollers to more clearly illustrate the degree of the angle of the coned portion of the roller end face.

As best seen in the exaggerated view of FIG. 2, the roller is of generally cylindrical formation having a cylindrical side wall 24 that is joined by a normal manufacturing radius 26 to a frusto-conical end portion 28. The frusto-conical portion 28 terminates in a flat end wall or face 30. The angle X may vary within a range of from 10 minutes to 5 degrees within normal manufacturing tolerances. The angle of the face portions 19 and 21 on the inner and outer races is matched to the angle of the frusto-conical surface portion 28 of the rollers.

It has been found with this particular construction that a lubricant wedge is established between the coned portions of the rollers and the faces 19 and 21 on the race flanges. Also, a rolling type approach is made by the coned roller ends against the opposed flange faces, and the bearing thus formed will operate at a lower temperature than one with square ended rollers due to the fact that there is considerably less sliding contact between the ends of the rollers and the flanges in the instant construction.

In addition, the bearing will transmit thrust loads considerably greater than those transmitted by square ended roller designs because a rolling, line contact is established against the roller race flange and this also gives the bearing a higher thrust carrying capacity than a ball bearing.

Accordingly, one advantage of the roller bearing of the invention is that a single such bearing will replace a combination of an axial type thrust bearing and a radial bearing. Additional advantages are that the bearing can operate over a prolonged period of time without lubrication, or with minimal lubrication, because the roller and race flange make more rolling contact than is the case with a square ended roller. Further, the rollers are guided by the retainer (not shown) rather than the race flanges and do not tend to jam between the flanges when roller skewing occurs. Also, the bearing can accept more misalignment since right angle corners have been eliminated by the sloping contact thus preventing the locking action that takes place when misalignment occurs in a square ended roller system. Finally, adjustable axial preloading can be utilized with a roller bearing manufactured according to the instant invention which has been difficult with standard roller bearing systems.

With square ended roller systems, there is a direct relationship between the amount of permissible misalignment and the axial dimension of the roller bearing. A general rule is that the misalignment can be no more than on the order of .0001 of the axial dimension of the bearing without causing premature failure of the bearing. Such failure, of course, is due in large measure to a scissors like phenomenon occurring between the end face of the roller and the flange of the race at the point of contact. With the roller bearing formed according to the instant invention, however, it has been found by test that misalignment in excess of the amount above specified will be tolerated without causing premature failure of the bearing. This is due to the rolling contact between the coned portion of the rollers and the similarly sloped faces of the race flanges.

In all known prior art involving coned end roller bearings, the slope of the coned portion of the roller has substantially exceeded 5 degrees, which is the limit provided by the instant invention; and in addition, the coned portion has been provided for entirely different purposes. Such prior art configurations failed to accomplish the results of the instant invention in that there was no realization of the critical range involved in achieving the new, unobvious and unexpected results achieved by the instant invention. For example, in square ended roller systems and all known prior coned end roller systems, such bearings were able to carry axial loads of not more than 40 percent of the radial loads. With the instant invention, by actual test, bearings made according to the preferred embodiment of the invention have carried axial loads equal to 75 percent of the radial load. This startling and unexpected result is believed to be due to the critical range as hereinbefore specified of the angle of the slope of the coned portion of the rollers acting in conjunction with the identically sloped face portions of the race flanges. So far as is known, prior attempts to achieve such results have been unsuccessful.

I claim:

1. A combination radial and axial load transmitting bearing comprising an inner race formed with at least one flange, an outer race formed with at least one flange, roller contacting faces formed on said flanges in opposed relation to each other, an anti-friction roller element received between said races and having end face portions in engagement with the roller contacting faces on said flanges, said end faces of the roller member including a sloping, frusto-conical portion in engagement with said flange faces, the angle formed between said frusto-conical portion and a radial plane perpendicular to the axis of said roller being in the range of 10 minutes to 5 degrees, and wherein said flange faces are substantially parallel to the frusto-conical portions of said roller end faces.

References Cited
UNITED STATES PATENTS 1,494,638   5/1924   Sheldon _____ 308—213

MARTIN P. SCHWADRON, Primary Examiner

H. F. SUSKO, Assistant Examiner